(12) United States Patent
Zheng et al.

(10) Patent No.: US 11,326,816 B2
(45) Date of Patent: May 10, 2022

(54) THERMAL EXPANSION VALVE

(71) Applicant: Zhejiang Sanhua Automotive Components Co., Ltd., Zhejiang (CN)

(72) Inventors: Zhengsong Zheng, Zhejiang (CN); Zhibin Yao, Zhejiang (CN); Jingen Yao, Zhejiang (CN); Xiaosong Xie, Zhejiang (CN); Gaohui Wang, Zhejiang (CN)

(73) Assignee: Zhejiang Sanhua Automotive Components Co., Ltd., Hangzhou (CN)

( * ) Notice: Subject to any disclaimer, the term of this patent is extended or adjusted under 35 U.S.C. 154(b) by 306 days.

(21) Appl. No.: 16/603,813

(22) PCT Filed: Apr. 4, 2018

(86) PCT No.: PCT/CN2018/081915
§ 371 (c)(1),
(2) Date: Oct. 8, 2019

(87) PCT Pub. No.: WO2018/188512
PCT Pub. Date: Oct. 18, 2018

(65) Prior Publication Data
US 2020/0116403 A1  Apr. 16, 2020

(30) Foreign Application Priority Data

Apr. 13, 2017 (CN) .......................... 201720384639.3
Dec. 11, 2017 (CN) .......................... 201711305992.9
Dec. 11, 2017 (CN) .......................... 201711306346.4

(51) Int. Cl.
*F25B 41/31* (2021.01)
*F16K 31/00* (2006.01)

(52) U.S. Cl.
CPC ............ *F25B 41/31* (2021.01); *F16K 31/002* (2013.01); *F25B 2341/06* (2013.01)

(58) Field of Classification Search
CPC .. F25B 41/31; F25B 2341/06; F25B 2500/01; F25B 2500/32; F16K 31/002
(Continued)

(56) References Cited

U.S. PATENT DOCUMENTS

2002/0185178 A1* 12/2002 Kobayashi .............. F25B 41/31
                                                                  137/454.2
2009/0242810 A1   10/2009 Yanagisawa et al.
2017/0052548 A1*  2/2017 Satake ................ F16K 31/1266

FOREIGN PATENT DOCUMENTS

CN        101101065 A       1/2008
CN        101581373 A       11/2009
(Continued)

OTHER PUBLICATIONS

Extended European Search Report for European Application No. 18784847.8, dated Dec. 11, 2020.
(Continued)

*Primary Examiner* — Steve S Tanenbaum
(74) *Attorney, Agent, or Firm* — Wolf, Greenfield & Sacks, P.C.

(57) ABSTRACT

A thermal expansion valve includes a power head and a valve body. The power head and the valve body are fixedly arranged. The power head includes a power head cover, a power head seat, and a membrane. The membrane includes a membrane recess and a corrugated portion. The membrane recess is located at the center position of the membrane. The corrugated portion is located at the peripheral position of the membrane recess. The membrane recess is recessed away from the power head cover. The valve body comprises a top portion. The top portion is provided with an opening. At least a part of the power head is extended into the opening. With an axial direction of the valve body as a projection (Continued)

direction, a projection of the power head towards the top portion falls on the top portion.

15 Claims, 10 Drawing Sheets

(58) Field of Classification Search
USPC ........................................................ 251/61.1
See application file for complete search history.

(56) References Cited

FOREIGN PATENT DOCUMENTS

| CN | 101726139 A | 6/2010 |
|----|-------------|--------|
| CN | 102094977 A | 6/2011 |
| CN | 102410678 A | 4/2012 |
| CN | 102692105 A | 9/2012 |
| CN | 103411357 A | 11/2013 |
| EP | 1 262 698 A2 | 12/2002 |
| EP | 2 503 267 A2 | 9/2012 |
| JP | H11-142026 A | 5/1999 |
| JP | 2001-050422 A | 2/2001 |
| JP | 2002-350010 A | 12/2002 |
| JP | 2006-105449 A | 4/2006 |
| JP | 2010-031998 A | 2/2010 |
| JP | 2010-190452 A | 9/2010 |
| JP | 2012-197990 A | 10/2012 |
| JP | 2012-225561 A | 11/2012 |
| JP | 2015-055386 A | 3/2015 |

OTHER PUBLICATIONS

Office Action for Japanese Application No. 2019-555134, dated Oct. 29, 2020.
International Search Report and Written Opinion for International Application No. PCT/CN2018/081915, dated Jun. 21, 2018.
Office Action for Korean Application No. 10-2019-7033146, dated Oct. 2, 2020.
JP2019-555134, Oct. 29, 2020, Office Action.
EP18784847.8, Dec. 11, 2020, Extended European Search Report.
KR10-2019-7033146, Oct. 2, 2020, Office Action.

* cited by examiner

THERMAL EXPANSION VALVE

This application is a national stage filing under 35 U.S.C. 371 of International Patent Application Serial No. PCT/CN2018/081915, filed Apr. 4, 2018, which claims the benefit of priorities to the following three Chinese patent applications, the entire contents of these applications are incorporated herein by reference in their entireties:

1) Chinese patent No. 201720384639.3, filed with the China National Intellectual Property Administration on Apr. 13, 2017, titled "THERMAL EXPANSION VALVE";
2) Chinese patent No. 201711305992.9, filed with the China National Intellectual Property Administration on Dec. 11, 2017, titled "THERMAL EXPANSION VALVE"; and
3) Chinese patent No. 201711306346.4, filed with the China National Intellectual Property Administration on Dec. 11, 2017, titled "THERMAL EXPANSION VALVE".

FIELD

The present application relates to the field of fluid control.

BACKGROUND

A thermal expansion valve is a throttling component commonly used in air conditioners and refrigeration equipment, which can throttle and depressurize a liquid refrigerant from a condenser and can regulate, based on the temperature at an outlet of an evaporator, the flow rate of the refrigerant flowing from the condenser to the evaporator, so as to meet the needs of continuously changing refrigeration load. The general principle of controlling the flow rate of the refrigerant by the thermal expansion valve is that: the temperature at the outlet of the evaporator is sensed by a power head, and the medium in the power head generates a corresponding degree of thermal expansion based on the temperature sensed by the power head, then the medium applies a pressure to a valve stem connected with the power head by the thermal expansion, and then the valve stem driven by the pressure pushes a valve core to move, thereby regulating an opening of a valve port and regulating the flow rate of the refrigerant.

Due to the limitation of an interface with refrigeration equipment such as an air conditioner, the width of the valve body is generally within a certain range, such that it is relatively difficult to reduce the weight of the valve. At present the requirements for weight reduction of the thermal expansion valve are increasing day by day, so the miniaturized and lightweight thermal expansion valve is also a development trend in the future.

SUMMARY

An object of the present application is to provide a thermal expansion valve having a miniaturized structure and a relatively light weight.

In order to achieve the above object, the following technical solution is adopted. A thermal expansion valve includes a power head and a valve body, and the power head is fixed to the valve body. The power head includes a power head seat, a power head cover and a membrane, and the power head cover is fixed to the power head seat. The membrane includes a first flat portion, the first flat portion is located close to an edge of the membrane, and the first flat portion is fixed to the power head cover and the power head seat. The membrane further includes a membrane recess and a corrugated portion, the membrane recess is located at a center position of the membrane, and the corrugated portion is located between the first flat portion and the membrane recess. The membrane recess is recessed in a direction away from the power head cover.

The valve body includes a top portion, and the top portion is provided with an opening. At least part of the power head extends into the opening. With an axial direction of the valve body as a projection direction, a projection of the power head towards the top portion falls entirely on the top portion.

The thermal expansion valve according to the above technical solution includes the membrane recess and the corrugated portion, the membrane recess is located at the center position of the membrane, the corrugated portion is located between the first flat portion and the membrane recess, and the projection of the power head towards the top portion of the valve body falls entirely on the top portion, such that a space between the membrane and the power head cover is enlarged, a peripheral diameter of the membrane becomes relatively smaller without reducing the charging amount of the refrigerant, and the size of the power head can be relatively smaller than that of the valve body, which helps to reduce weight.

DETAILED DESCRIPTION OF EMBODIMENTS

Figure 1:
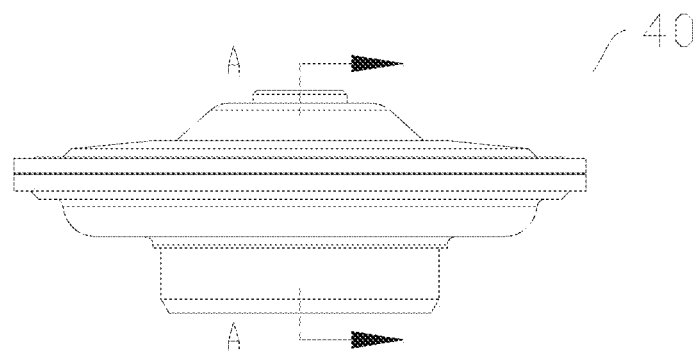
FIG. 1 is a schematic structural view of a power head of a thermal expansion valve according to an embodiment of the present application.
Figure 2:
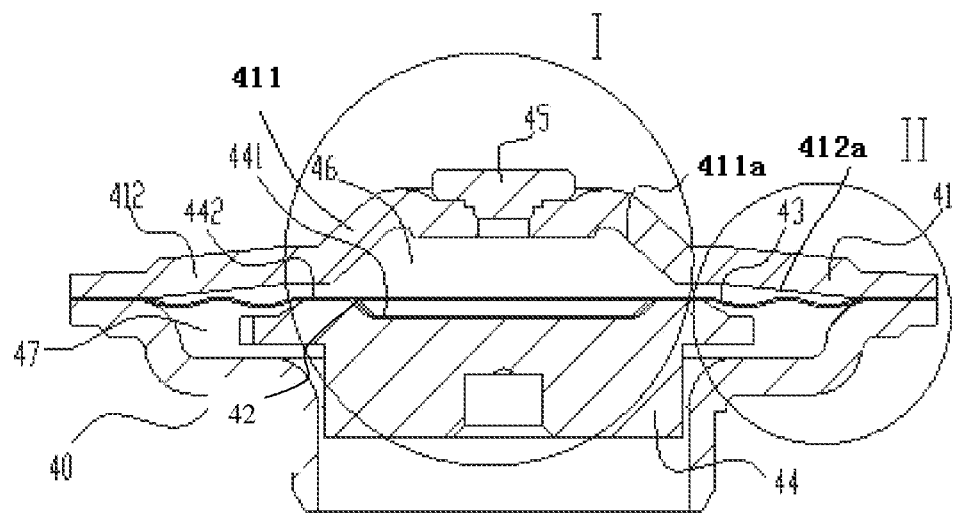
FIG. 2 is a schematic sectional view of the power head taken along the line A-A shown in FIG. 1.
Figure 3:
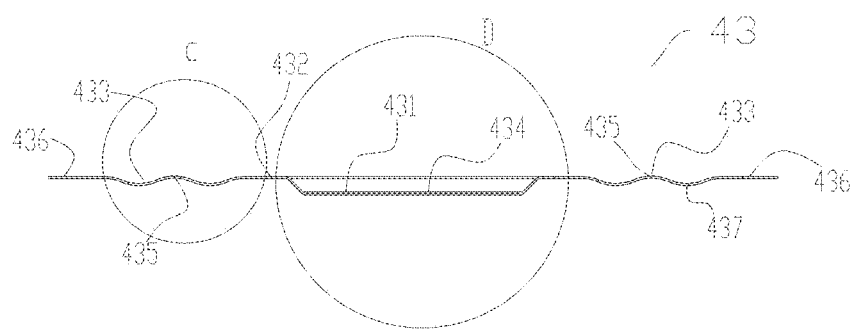
FIG. 3 is a schematic enlarged view of the membrane shown in FIG. 2.

Referring to FIGS. 1 and 2, FIG. 1 is a schematic structural view of a power head 40, and FIG. 2 is a schematic sectional view of the power head taken along the line A-A shown in FIG. 1. The power head 40 includes a power head cover 41, a power head seat 42, a membrane 43, a transmission member 44 and a sealing plug 45. The membrane 43 is arranged between the power head cover 41 and the power head seat 42, and the power head cover 41 is fixed to the power head seat 42, for example, by welding. A closed chamber 46 and a pressure equalizing chamber 47 are provided inside the power head 40, and the membrane 43 separates the closed chamber 46 from the pressure equalizing chamber 47. The closed chamber 46 is filled with refrigerant gas, and the closed chamber 46 is sealed by the sealing plug 45 at the top.

Figure 5:
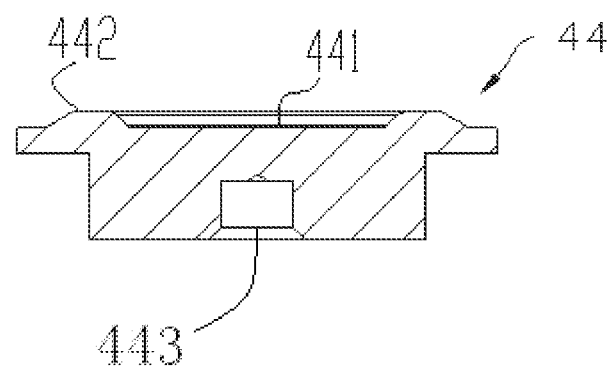
FIG. 5 is a schematic view of the transmission member shown in FIG. 2.
Figure 15:
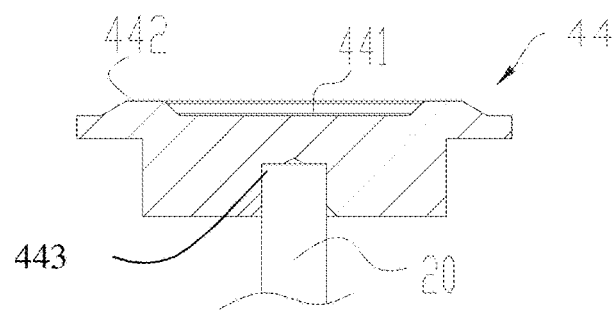
FIG. 15 is a schematic partial view of an assembly of the transmission member and a valve stem.

The transmission member 44 is arranged below the membrane 43, and the membrane 43 can apply a force to the transmission member 44. During the operation of the thermal expansion valve, there is a certain pressure in the closed chamber 46, and the transmission member 44 is in a balanced state in the pressure equalizing chamber 47. Referring to FIGS. 5 and 15, the transmission member 44 includes a position-limiting groove 443, the position-limiting groove 443 is arranged in cooperation with one end of the valve stem 20, and the position-limiting groove 443 does not exceed an edge of the power head 40 in an axial direction of the power head 40, that is, the position-limiting groove 443 does not exceed an enclosed space bounded by an outer edge of the power head cover 41 and the power head seat 42. In a case that the power head seat has an opening, the edge of the power head seat is based on a virtual plane to which an actual edge of the power head seat belongs. In the present embodiment, the transmission member is in a form of a sheet. It should be noted that the transmission member may also be in a form of a bar, for example, one part of the transmission member is located at the power head, and another part of the transmission member extends into the valve body to serve as a valve stem, which is equivalent to that the transmission sheet is integrated with the valve stem.

Referring to FIGS. 2, 3, 4, and 5, the membrane 43 is located between the power head cover 41 and the power head seat 42, and the membrane 43 does not exceed the edge of the power head 40 in the axial direction of the power head 40, which enables the membrane 43 to respond to the temperature and pressure of the fluid in the equalizing chamber. The membrane 43 includes a membrane recess 431, a corrugated portion 433, a first flat portion 436 and a second flat portion 432. The membrane 43 is substantially circular, the membrane recess 431 is located at a center position of the membrane, the first flat portion 436 is adjacent to an outer side of the membrane 43, or in other words, the first flat portion 436 is located close to an edge of the membrane 43, the corrugated portion 433 is located between the first flat portion 436 and the membrane recess 431, the second flat portion 432 is located between the membrane recess 431 and the corrugated portion 433, and the membrane recess 431 is recessed in a direction away from the power head cover 41. The membrane 43 has a small thickness, the membrane recess 431 includes a protruding top wall 430, and the protruding top wall is located on one side facing the transmission member 44. The membrane 43 is provided with the membrane recess 431 at the center position, and the membrane recess 431 is recessed in a direction away from the power head cover 41, such that a space between the membrane 43 and the power head cover 41 is enlarged. Compared with a membrane without the membrane recess 431, the space between the power head cover 41 and the membrane 43 is relatively enlarged, such that a peripheral diameter of the membrane can relatively be reduced without reducing the charging amount, which is advantageous for miniaturization of the power head. In addition, a lift amount of the membrane is influenced to a certain extent due to the relative reduction of the diameter of the membrane, but the influence of the reduction of the diameter on the lift amount is reduced or eliminated because the membrane 43 is provided with the membrane recess 431 at the center position, which is beneficial to up and down displacement of the membrane 43. Moreover, since the second flat portion 432 is located between the membrane recess 431 and the corrugated portion 433, the second flat portion 432 can be used to stabilize the structure of the membrane, when the corrugated portion 433 is deformed up and down by force, that is, the second flat portion applies a downward force to the transmission member 44 under an action of a differential pressure force, or the second flat portion is subjected to an upward force by the transmission member 44, such that the performance of the membrane 43 is more stable, and the valve can control the flow rate more stably. It should be noted that the center position and the edge position are relative, the center position refers to a position around a center point of the membrane 43, and the center position is not limited to one point, but is a region having a certain area.

The power head cover 41 includes a first inner wall portion 411a and a second inner wall portion 412a. The second inner wall portion 412a is arranged around the first inner wall portion 411a, and the first inner wall portion 411a protrudes upward relative to the second inner wall portion 412a, here the protruding upward refers to protruding in a direction relatively away from the power head seat 42. A position of the first inner wall portion 411a is opposite to a position of the membrane recess 431, at least part of the second flat portion 432 is arranged opposite to at least part of the second inner wall portion 412a, and the corrugated portion 433 is arranged opposite to at least part of the second inner wall portion 412a.

During the operation of the thermal expansion valve, the membrane 43 is deformed due to the pressure difference between top and bottom surfaces of the membrane. The membrane recess 431 has the protruding top wall 430. The protruding top wall 430 is a plane segment, and the protruding top wall 430 is in contact with or close to the transmission member 44. One side of the second flat portion 432 is in contact with or close to the transmission member 44. The transmission member 44 has a transmission member recess 441 (refer to FIGS. 2 and 5), and the transmission member recess 441 is recessed in a same direction as the membrane recess 431. The transmission member recess 441 is located at a center position of the transmission member 44, the transmission member recess 441 is matched with a shape of the protruding top wall 430, and the protruding top wall 430 is in contact with or close to a bottom wall of the transmission member recess 441. The power head includes a bottom opening, and an equivalent diameter of an outer periphery of the transmission member is greater than that of the bottom opening, such that the transmission member 44 can be hung on the power head seat without falling down, and the membrane recess 431 has a certain holding force. Moreover, the abutment of the transmission member 44 helps the membrane 43 to maintain the stability of its performance and to prolong the service life. When a pressure of the closed chamber 46 is greater than a pressure of the pressure equalizing chamber 47, at least part of the transmission member 44 comes into contact with the membrane 43, and the transmission member 44 provides a deformation force to the membrane 43.

The structure of the membrane 43 includes the membrane recess 431, the second flat portion 432 and the corrugated portion 433. The second flat portion 432 is located between the membrane recess 431 and the corrugated portion 433. Specifically, the transmission member 44 includes a support surface 442, and the support surface 442 is in contact with a bottom surface of the second flat portion 432 to enhance an anti-deformation capability of the membrane 43, such that the corrugated portion 433 is deformed by the pressure.

In an embodiment, the protruding top wall 430 is in contact with the bottom wall of the transmission member recess 441, and one side of the second flat portion 432 is close to the transmission member 44. In another embodiment, the protruding top wall 430 is close to the bottom wall of the transmission member 44, and one side of the second flat portion 432 is in contact with the transmission member 44.

Figure 4:
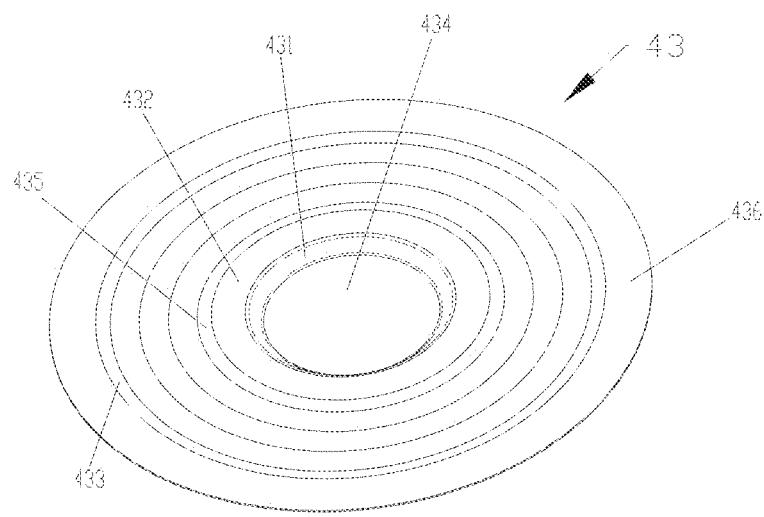
FIG. 4 is a schematic perspective view of the membrane shown in FIG. 2.
Figure 6:
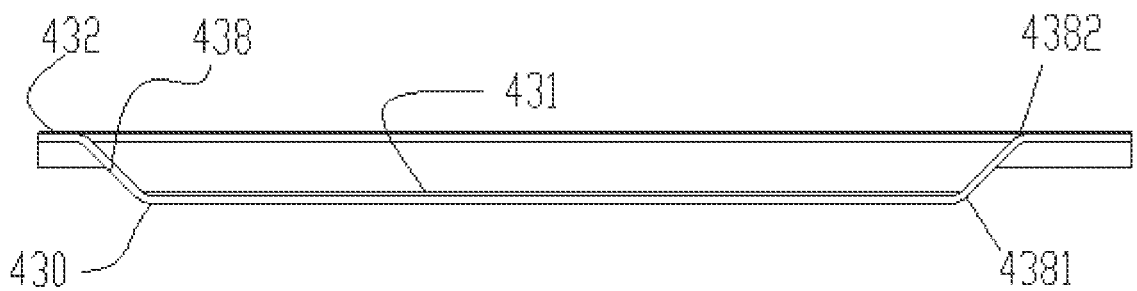
FIG. 6 is a schematic enlarged view of the position D shown in FIG. 3.

Referring to FIG. 4, the membrane recess 431 has a substantially truncated cone shape, and the membrane recess 431 occupies ⅑ to ¼ of the area of the membrane 43. The bottom of the membrane recess is substantially a circular surface, such that given the size of the membrane recess 431 is substantially the same, the plane segment with the circular surface at the bottom enables the membrane recess 431 to have a larger volume than a membrane recess with other shapes at the bottom, and is easier for the subsequent production and processing. As shown in FIG. 6, the membrane recess 431 has a bottom wall 434 and a side wall 438. The side wall 438 surrounds the bottom wall 434. The side wall 438 includes an inner circumferential portion 4381 and an outer circumferential portion 4382, the inner circumferential portion 4381 is adjacent to the bottom wall 434, and the outer circumferential portion 4382 is adjacent to the second flat portion 432. A distance between the inner circumferential portion 4381 and the center of the membrane 43 is smaller than a distance between the outer circumferential portion 4382 and the center of the membrane 43. With the axial direction of the power head 40 as a height direction, an equivalent diameter of the bottom wall 434 is at least 5 times the height of the side wall 438. Thus, the second flat portion 432 smoothly transitions to the bottom wall 434, and an area of the bottom wall is significantly greater than that of the side wall 438, which improves the strength of the membrane recess 431 and improves the anti-deformation capability of the membrane. In the perspective view shown in FIG. 6, the side wall 438 includes a first end portion which is relatively close to the top and a second end portion which is relatively close to the bottom. The first end portion is adjacent to the bottom of the membrane recess, the second end portion is adjacent to the second flat portion, the first end portion corresponds to the inner circumferential portion 4381, and the second end portion corresponds to the outer circumferential portion 4382.

Figure 8:
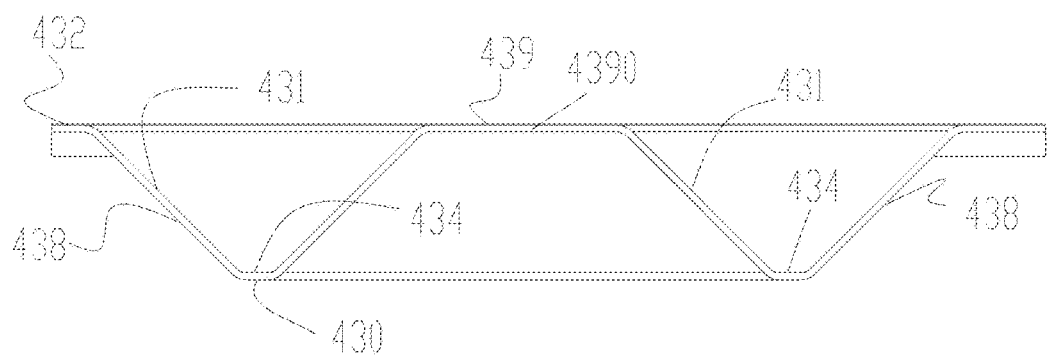
FIG. 8 is a schematic enlarged view of yet another embodiment of the position D shown in FIG. 3.
Figure 9:
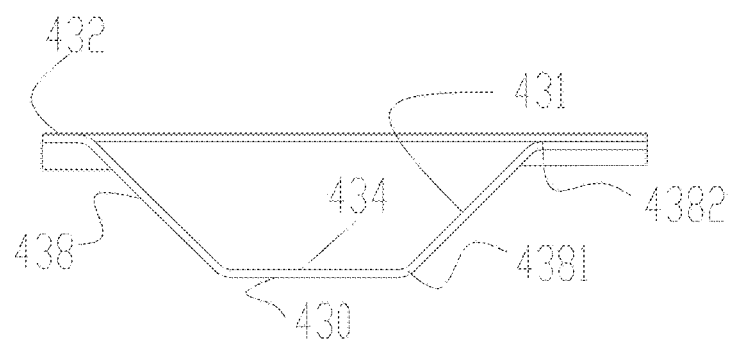
FIG. 9 is a schematic enlarged view of still another embodiment of the position D shown in FIG. 3.

In other embodiments, referring to FIGS. 8 and 9, the membrane recess 431 has a substantially truncated cone shape, and the membrane recess 431 occupies 1/10 to ¼ of the area of the membrane 43. The membrane recess 431 has a bottom wall 434 and a side wall 438. The side wall 438 surrounds the bottom wall 434. The side wall 438 includes an inner circumferential portion 4381 and an outer circumferential portion 4382. The inner circumferential portion 4381 is adjacent to the bottom wall 434, and the outer circumferential portion 4382 is adjacent to the second flat portion 432. A distance between the inner circumferential portion 4381 and the center of the membrane 43 is smaller than a distance between the outer circumferential portion 4382 and the center of the membrane 43.

Figure 7:
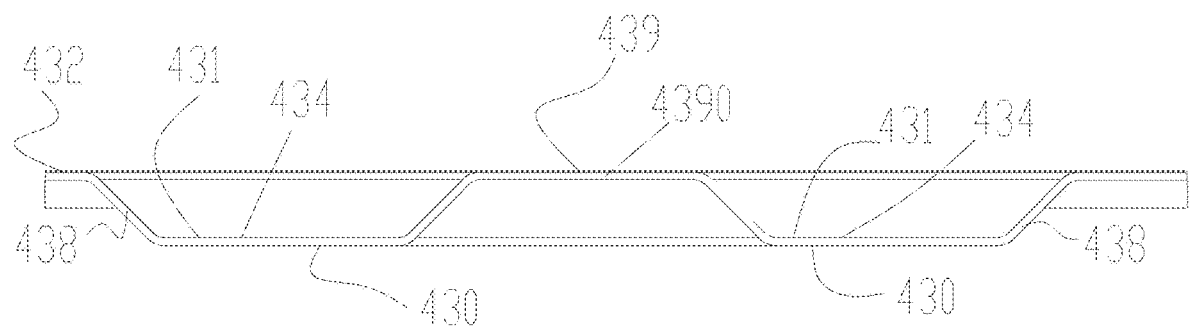
FIG. 7 is a schematic enlarged view of another embodiment of the position D shown in FIG. 3.

In some other embodiments, referring to FIGS. 7 and 8, the membrane 43 includes two or more membrane recess 431. Each of the membrane recess 431 has a bottom wall 434, and the bottom wall 434 is a plane segment. Each of the membrane recess 431 includes a protruding top wall 430. The protruding top wall 430 relatively faces the transmission member 44, and is in contact with the transmission member 44. The membrane 43 includes a top segment 4390. The top segment 4390 is opposite to the first inner wall portion 411a, and there is a clearance between the top segment 4390 and the first inner wall portion 411a. The top segment 4390 and the side walls of the membrane recess 431 together form a ridge portion 439. In some other embodiments, the top segment 4390 includes side walls facing the transmission member 44, and the side walls are in contact with the transmission member 44, which helps to ensure the support for the two or more membrane recesses 431 of the membrane 43, helps the membrane to be more uniformly stressed, and helps to prolong the service life of the thermal expansion valve.

Referring to FIGS. 7 and 8, two membrane recesses 431 are provided, and the ridge portion 439 is located between the two adjacent membrane recesses 431. With the axial direction of the power head 40 as the height direction, each portion of the ridge portion 439 has a similar height as the membrane recess 431.

In some other embodiments, the protruding top wall 430 may have a circular arc structure. In a case that the protruding top wall 430 has the circular arc structure, the support between the membrane 43 and the transmission member 44 is realized by arranging the second flat portion 432 in contact with the transmission member 44.

Referring to FIGS. 10 to 14, the corrugated portion 433 has an annular portion 435 protruding toward the power head cover 41, and the number of the annular portion 435 is 1 to 3. By providing 1 to 3 annular portion, the membrane has a good deformation capability and is easy to move up and down after subjected to the force, such that in a case that the membrane is subjected to the force, the displacement of the membrane can be proportional to the force within a certain range, and errors of the membrane can be avoided in the process of being subjected to the pressure difference. Besides, the arrangement of the annular portion 435 is further helpful for prolonging the service life of the membrane. Distances between adjacent annular portions 435 are approximately equal. The membrane 43 is circular, and radii of the annular portions 435 are different along a radial direction of the membrane 43.

Figure 10:
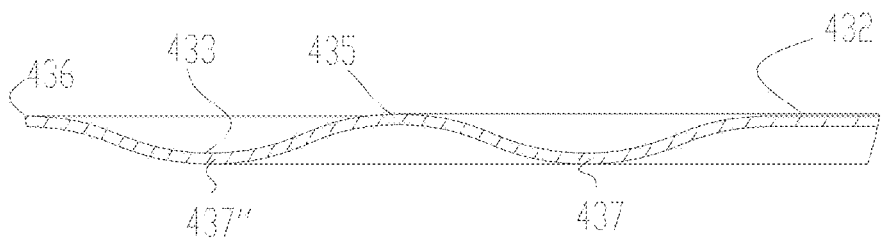
FIG. 10 is a schematic enlarged view of a first embodiment of the position C shown in FIG. 3.
Figure 14:
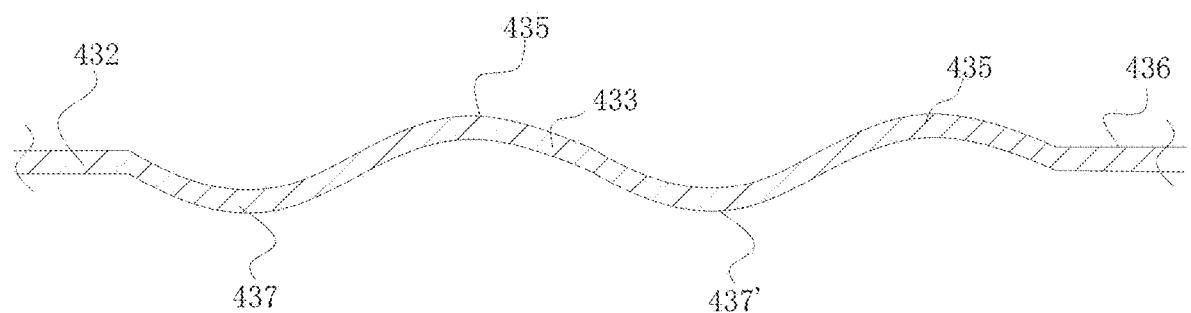
FIG. 14 is a schematic enlarged view of a fifth embodiment of the position C shown in FIG. 3.

In an embodiment, referring to FIGS. 10 and 14, the membrane 43 includes a trough portion 437. The trough portion 437 is located between the second flat portion 432 and the annular portion 435, such that the trough portion between the second flat portion 432 and the annular portion 435 may be deformed by force. The second flat portion 432 is arranged outside the membrane recess 431 of the membrane, the trough portion 437 is arranged outside the second flat portion 432, and the annular portion 435 is arranged outside the trough portion 437, such arrangement facilitates the displacement of the trough portion 437, and enables the trough portion to move responding to small pressures, which is more helpful to improving the regulating accuracy. In addition, through the arrangement of the trough portion, the membrane 43 is less likely to interfere with the power head cover 41, which is helpful to prolonging the life of the thermal expansion valve.

Figure 11:
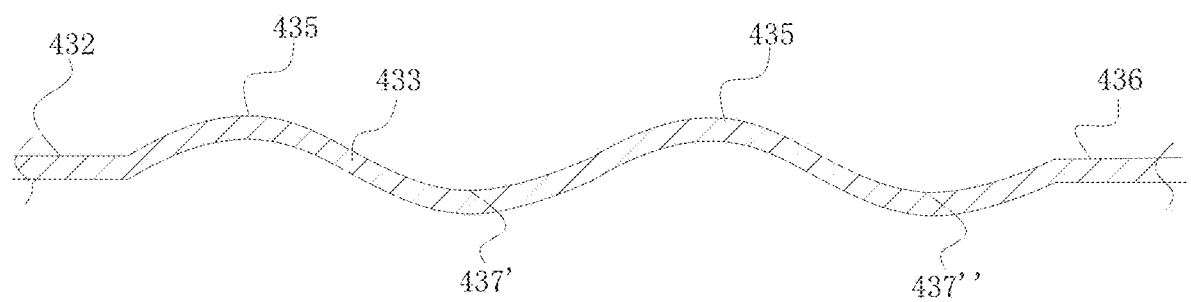
FIG. 11 is a schematic enlarged view of a second embodiment of the position C shown in FIG. 3.
Figure 12:
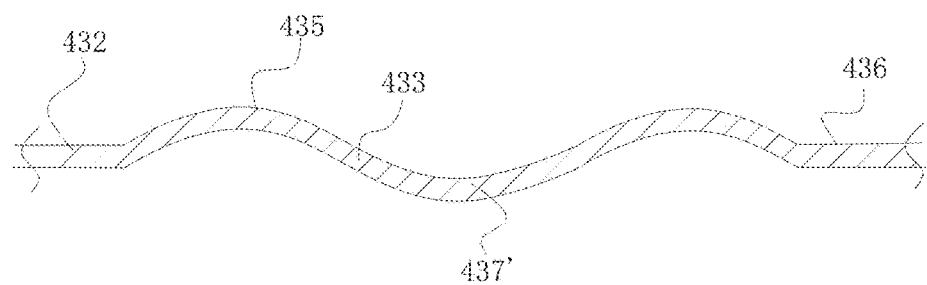
FIG. 12 is a schematic enlarged view of a third embodiment of the position C shown in FIG. 3.
Figure 13:
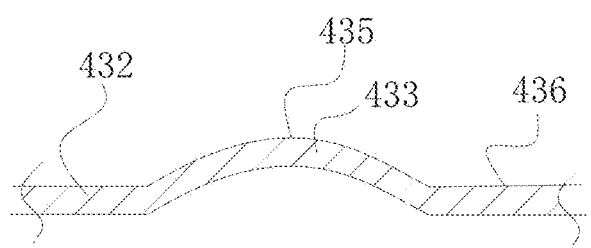
FIG. 13 is a schematic enlarged view of a fourth embodiment of the position C shown in FIG. 3.

In some other embodiments, referring to FIGS. 11, 12 and 13, the annular portion 435 is adjacent to the second flat portion 432, such that the annular portion 435 may be deformed after subjected to the force, which enables the annular portion to move responding to small pressures, and is helpful to improving the regulating accuracy.

In a case that two or more annular portions 435 are provided, the membrane 43 includes a trough portion 437', and the trough portion 437' is located between adjacent annular portions 435, which allow the annular portions and the trough portion to be deformed after subjected to the force, and enables the membrane to move responding to small pressures. Moreover, through the arrangement of the two or more annular portions 435 and the trough portion 437', the membrane is easily to be deformed and to respond to small pressures, which is helpful to improving the regulating accuracy.

The membrane 43 includes the first flat portion 436, and the first flat portion 436 is located close to the edge of the membrane 43. One side of the first flat portion 436 may be fixed to the power head cover 41 by welding, and another side of the first flat portion 436 may be fixed to the power head seat 42 also by welding. Through the arrangement of the first flat portion 436, when the corrugated portion 433 is subjected to the force and moves up and down, the first flat portion 436 is helpful to the stability of the membrane 43, such that the membrane has a better pressure resistance in the power head.

In other embodiments, the annular portion 435 is adjacent to the first flat portion 436, which allows the annular portion 435 to be deformed after subjected to the force, enables the annular portion 435 to move responding to small pressures, and is helpful to improving the regulating accuracy.

In other embodiments, the membrane 43 includes a trough portion 437", and the trough portion 437" is located between the annular portion 435 and the first flat portion 436. Through the arrangement of the trough portion, the membrane is less likely to interfere with the power head cover, which is helpful to prolonging the life of the thermal expansion valve.

In other embodiments, at least one of the second flat portion 432 and the first flat portion 436 is adjacent to the trough portion. Both the second flat portion 432 and the first flat portion 436 may be adjacent to the trough portion, or one of the second flat portion 432 and the first flat portion 436 is adjacent to the trough portion, or both the second flat portion 432 and the first flat portion 436 are adjacent to the annular portion 435.

The power head having the above structure can be applied to the thermal expansion valve. Because the size of the power head is relatively small, the weight of the thermal expansion valve can be relatively reduced without changing the size of the valve body. FIG. 16 to FIG. 24 show some embodiments of the thermal expansion valve, and it should be understood that features of the membrane of the power head are not limited to the structure shown in the drawings.

Figure 16:
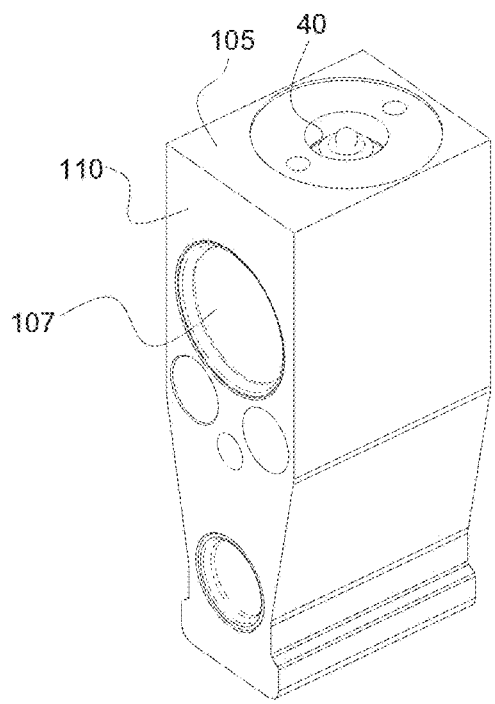
FIG. 16 is a schematic structural view of the thermal expansion valve according to another embodiment of the present application.
Figure 17:
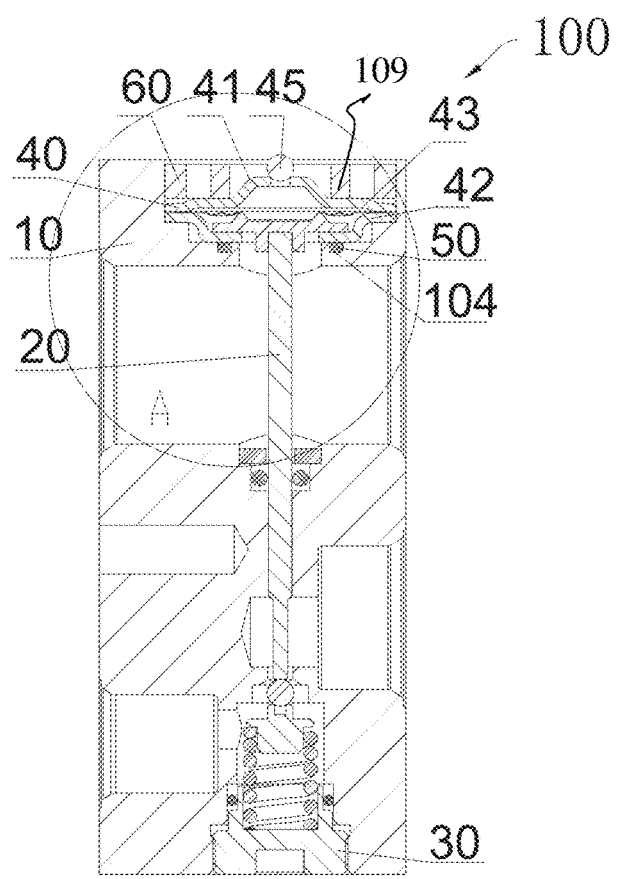
FIG. 17 is a schematic sectional view of the thermal expansion valve shown in FIG. 16.
Figure 18:
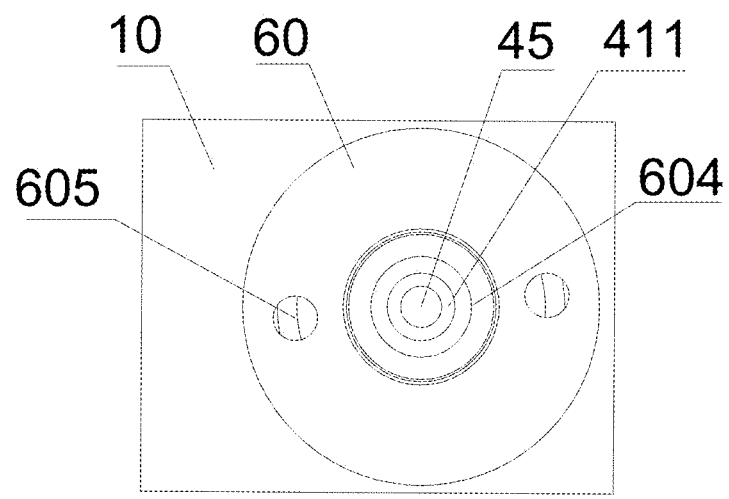
FIG. 18 is a schematic top view of the thermal expansion valve shown in FIG. 16.
Figure 19:
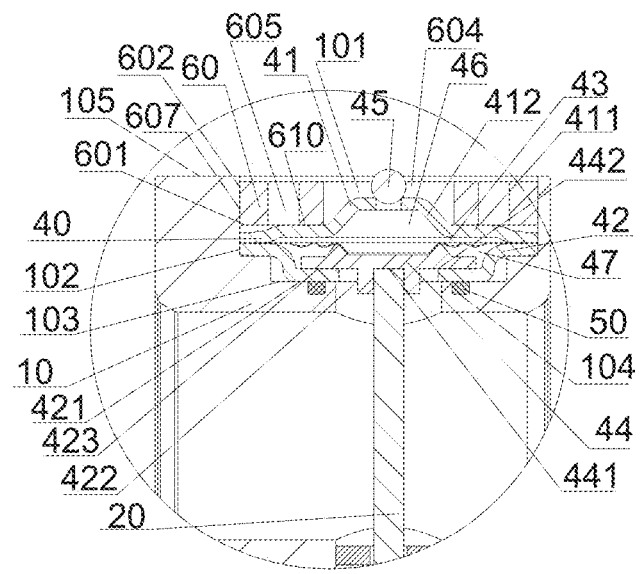
FIG. 19 is a schematic enlarged view of the portion A shown in FIG. 17.

In an embodiment, referring to FIG. 16, FIG. 16 illustrates the structure of the embodiment of the thermal expansion valve. Referring to FIG. 17, FIG. 17 illustrates a schematic sectional view of the thermal expansion valve. The thermal expansion valve 100 includes a valve body 10, a valve stem 20, a regulating base 30 and a power head 40. The power head 40 is fixed to one side of the valve body 10, and the regulating base 30 is fixed to another side of the valve body 10. The valve stem 20 is located inside the valve body 10, one end of the valve stem 20 is fixed or position-limited to the power head 40, and another end of the valve stem 20 is fixed or position-limited to the regulating base 30.

The valve body 10 includes a top portion 105, the top portion 105 is provided with an opening 109, and at least part of the power head 40 extends into the opening 109. With an axial direction of the valve body 10 as a projection direction, a projection of the power head 40 towards the top portion 105 falls within a range of the top portion 105, that is, an outer edge of the power head 40 is smaller than an outer edge of the top portion 105 of the valve body 10. The valve body 10 includes a side portion 110, the side portion 110 has a fluid through hole 107, and a length of an intersecting line of the top portion 105 and the side portion 110 is greater than or equal to an equivalent diameter of the power head 40. It should be noted that in a case that the top portion 105 transitions to the side portion 110 by an arc, the top portion 105 includes an edge of the arc transition, and the intersecting line of the top portion 105 and the side portion 110 includes an intersecting line of the arc transition and the side portion 110.

In a case that the valve body has a square structure, the valve body 10 includes at least two side portions 110, and each of the side portions 110 has the fluid through hole 107. The top portion 105 has an intersecting line with each side portion 110, a distance between the top portion 105 and each of intersecting lines is greater than or equal to an equivalent diameter of the power head 40. In a case that the valve body has a substantially circular structure, the valve body 10 includes the side portion, and the side portion has a substantially circular or arc shape. A distance of the intersection lines of the top portion 105 and the side portion of the valve body is greater than or equal to the equivalent diameter of the power head 40.

The transmission member 44 includes a position-limiting groove 443. The valve body 10 includes an accommodating cavity 101, and at least part of the power head 40 is located in the accommodating cavity 101. The position-limiting groove 443 is located on a side portion of the transmission member 44 relatively away from the accommodating cavity 101. One end portion of the valve stem 20 is located in the position-limiting groove 443, and the valve stem 20 can push the transmission member 44 to move upward. As described above, the transmission member 44 may also be a bar to form a valve stem structure. The power head seat 42 includes a bottom portion 421, the bottom portion 421 is arranged opposite to a wall portion of the valve body, and the bottom portion 421 is in sealing engagement with the valve body 10. For example, the thermal expansion valve includes a sealing member 50, and the sealing member 50 may be located in an area between the bottom portion 421 and the valve body 10. At least part of the bottom portion 421 may be separated from the valve body 10 by the sealing member 50. The bottom portion 421 is provided with a through hole 422 located at a center position of the power head seat 42, and at least part of the transmission member 44 is located in the through hole 422. There is a distance between an outer edge of the transmission member 44 forming the position-limiting groove 443 and a wall portion of the power head seat 42 forming the through hole 422. The transmission member 44 includes a circumferential bottom wall 444, and at least part of the circumferential bottom wall 444 corresponds to an inner wall 423 of the power head seat 42. The sealing between the power head seat 42 and the valve body 10 realizes the sealing between the power head 40 and the valve body 10. When the membrane 43 moves up and down due to the pressure difference, the membrane 43 can apply force to the transmission member 44, and the transmission member 44 then applies force to the valve stem 20, such that the membrane 43 can apply the sensed pressure difference relatively evenly to the transmission member 44, which makes an action of the membrane on the valve stem more accurate.

The valve body 10 has an integrated structure, and includes the accommodating cavity 101. At least part of the power head 40 is located in the accommodating cavity 101, and an outer diameter of the power head 40 is smaller than or equal to a diameter of a port (that is, the top opening 109) of the accommodating cavity 101. The valve body 10 includes a first side wall 102 and a bottom wall 103 of the accommodating cavity 101. Since the outer diameter of the power head 40 is smaller than or equal to the diameter of the port of the accommodating cavity 101, the power head 40 can be accommodated in the accommodating cavity 101, such that the thermal expansion valve is smaller in the height direction, which is helpful to reducing the height of the power head above the valve body, miniaturizing the product, and making the product suitable for an circumstance with a small installation space. Compared with a situation in which the power head protrudes outside of the valve body, the height of the power head above the valve body is reduced by 25% to 35%. In addition, due to the arrangement of the membrane recess 431 of the membrane 43, the volume of the closed chamber is slightly larger than that of a membrane structure designed without the membrane recess. In a case that the fluid charging amount is substantially the same, the arrangement of the membrane recess can reduce the diameter of the membrane and the diameter of the power head, and can miniaturize the structure of the power head, such that the weight of the thermal expansion valve is relatively reduced to meet the requirements of small size and light weight. Herein, the port of the accommodating cavity is also referred to as the top opening of the valve body.

Referring to FIGS. 17 to 21, the thermal expansion valve 100 includes fixing members 60, 60', and 60". The power head 40 includes an outer wall portion 610, which is part of an outer wall of the power head cover 41. The outer wall portion 610 faces the port of the accommodating cavity 101, that is, the outer wall portion faces the port of the accommodating cavity 101 after being mounted into the accommodating cavity 101. At least part of the fixing members 60, 60', and 60" is located in the accommodating cavity 101. With a position where the accommodating cavity 101 is arranged in the valve body 10 as an upper position, at least part of the fixing members 60, 60', and 60" is arranged above the outer wall portion 610 along the axial direction of the valve body 10. The fixing members 60, 60', and 60" include a bottom wall 601 which is relatively close to or facing the power head, and at least part of the bottom wall 601 is in contact with the outer wall portion 610, or at least part of the bottom wall 601 is close to the outer wall portion 610 and the bottom wall 601 is in indirect contact with the outer wall portion 610. The fixing members 60, 60', and 60" are assembled and fixed to the valve body, and the power head 40 is fixed to the valve body 10 via the fixing members 60, 60', and 60". The fixing member is, for example, a stud structure, a clamp, a pin, a pressure plate or the like.

In an embodiment, the fixing member 60 is substantially a stud structure. The fixing member 60 is provided with an external thread, and the fixing member 60 is in a threaded connection with the valve body 10. The fixing member 60 includes the bottom wall 601 relatively close to or facing the power head, at least part of the bottom wall 601 is in contact with the power head 40 or in indirect contact with the power head 40 by providing other components, and the power head 40 is fixed to the valve body 10 via the fixing member 60. At least part of the bottom wall 601 of the fixing member 60 abuts against the power head cover 41 or abuts against the power head cover 41 by providing other components. Since at least part of the bottom wall 601 of the fixing member 60 directly or indirectly abuts against the power head cover 40, a surface of the power head cover 41 is subjected to a pressure of the fixing member 60, which is beneficial for the power head 40 to keep the structure of the power head cover 41 constant in a pressure detection procedure and effectively maintains the stability of the product.

The power head cover 41 includes a body portion 411 and a protruding portion 412, and the protruding portion 412 is located at a center position of the power head cover 41. The valve body 10 includes the first side wall 102, and the first side wall 102 is a part of the inner wall forming the accommodating cavity 101. The fixing member 60 includes a center through hole 604 and a connecting portion 607. The protruding portion 412 is arranged in the center through hole 604, and the connecting portion 607 is formed at a circumferential side wall portion 602 of the fixing member 60. The fixing member 60 is fixedly arranged relative to the first side wall 102.

More specifically, the power head cover 41 includes the body portion 411 and the protruding portion 412, the protruding portion 412 is located at the center position of the power head cover 41, and the body portion 411 surrounds the protruding portion 412. The sealing plug 45 is located at a center position of the protruding portion 412. At least part of the bottom wall 601 of the fixing member 60 is arranged in direct or indirect contact with part of the body portion 411.

In other embodiments, the body portion 411 surrounds the protruding portion 412, and the body portion 411 extends from the protruding portion 412 to the edge of the power head cover 41. The sealing plug 45 is located at the center position of the protruding portion 412. At least part of the bottom wall 601 of the fixing member 60 is arranged in direct or indirect contact with the body portion 411. Since the body portion 411 extends from the protruding portion 412 to the outer edge of the power head cover 41, the fixing member 60 can completely cover the body portion 411, which is more beneficial to the strength of the body portion 411 and to maintaining the stability of an outer shape of the body portion.

The connecting portion 607 of the fixing member 60 is integrally formed on the circumferential side wall portion 602 of the fixing member 60 in a form of an external thread. An inner diameter of the first side wall 102 of the valve body 10 is greater than or equal to the outer diameter of the power head 40. At least part of the first side wall 102 is provided with an internal thread, and the internal thread extends inward in the axial direction from the port of the accommodating cavity 101 or from a position adjacent to the port. The external thread fits with the internal thread provided on the valve body 10. The fixing member 60 is in threaded connection with the valve body 10 through the internal and external threads, which not only is convenient to assemble, but also enables the fixing member 60 to apply a certain pressure on the power head cover 41 to maintain the outer shape of the power head cover and helps to stabilize the performance of the product.

The fixing member 60 includes the center through hole 604, and at least part of the protruding portion 412 is located in the center through hole 604. Since a diameter of the center through hole 604 is greater than a circumferential diameter of the protruding portion 412, the protruding portion 412 can pass through the fixing member 60, and the structure of the protruding portion 412 is not adversely affected by the assembly process of the fixing member 60.

The fixing member 60 includes at least two positioning holes 605, and openings of the at least two positioning holes 605 are located on a same side of the fixing member 60 relatively away from the power head. The at least two positioning holes 605 are arranged in symmetry about a center axis of the fixing member 60. During the assembly process, the positioning holes 605 are configured to place the tooling, which effectively maintains the fixing member 60 symmetric about the center of the valve body, and effectively avoids the influence of the inclination of the fixing member 60 on the performance of the product during the process of assembling the fixing member 60 to the valve body.

Figure 20:
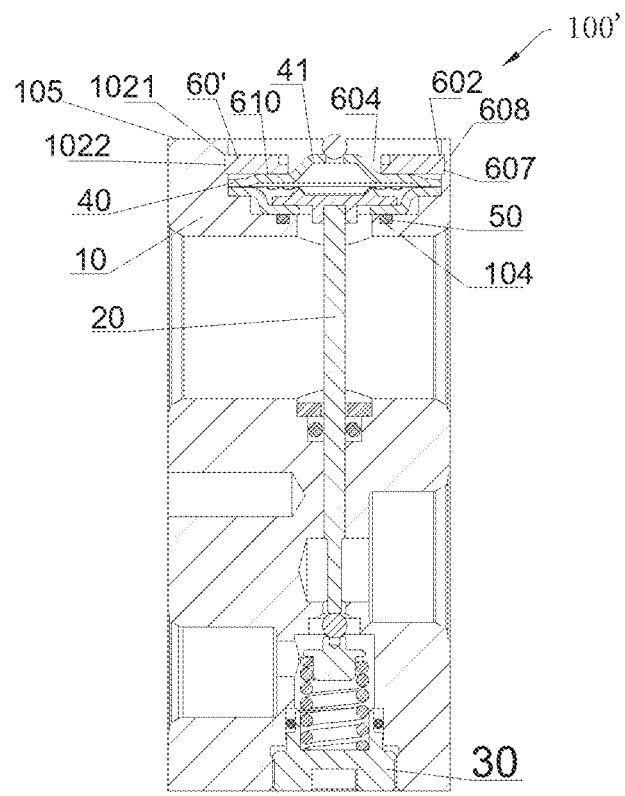
FIG. 20 is a schematic sectional view of another embodiment of the thermal expansion valve according to the present application.

In another embodiment, referring to FIG. 20, FIG. 20 is a schematic sectional view of a thermal expansion valve 100'. The thermal expansion valve 100' includes a fixing member 60', and the fixing member 60' is a clamp spring. The clamp spring includes the center through hole 604. The power head cover 41 includes the body portion 411 and the protruding portion 412, and the protruding portion 412 is located at the center position of the power head cover 41. The valve body 10 includes the first side wall 102, and the fixing member 60' includes the center through hole 604 and the connecting portion 607. The protruding portion 412 is located in the center through hole 604, and the connecting portion 607 is formed at the circumferential side wall portion 602 of the fixing member 60'. The fixing member 60' is fixedly arranged relative to the first side wall 102. The protruding portion 412 is located at a corresponding position in the center through hole 604. Since the diameter of the center through hole 604 is larger than the circumferential diameter of the protruding portion 412, the protruding portion 412 can pass through the fixing member 60', and the structure of the protruding portion is not adversely affected by the assembly of the fixing member 60'.

The valve body 10 includes the first side wall 102, and at least part of the first side wall 102 is provided with a groove 1021. The height of the groove 1021 is higher than the height of the body portion 411 in the height direction of the valve body 10. From the perspective of FIG. 20, the groove 1021 is located above the body portion 411. The groove 1021 includes a groove bottom wall 1022, and the groove bottom wall 1022 is opposite to an opening of the groove. The fixing member 60' includes the connecting portion 607, and the connecting portion 607 is at least part of the circumferential side wall portion 602 of the clamp spring. The connecting portion 607 is located in the groove 1021, and an outer side portion 608 of the connecting portion 607 abuts against the groove bottom wall 1022 to remain relatively fixed. The outer side portion 608 can directly abut against the groove bottom wall 1022, or can abut against the groove bottom wall by providing intermediate components. The fixing member 60' is fixed to the valve body by assembling, which not only is convenient to assemble, but also enables the fixing member 60' to apply a certain pressure onto the power head cover to maintain the outer shape of the power head cover and helps to stabilize the performance of the product.

The fixing member 60' includes at least two positioning holes 605, and the openings of the at least two positioning holes 605 are located on a same side of the fixing member 60' relatively away from the power head. The at least two positioning holes 605 are arranged in symmetry about a center axis of the fixing member 60', which effectively maintains the fixing member 60' symmetric about the center of the valve body, and effectively avoids the influence of the inclination of the fixing member 60' on the performance of the product during the process of assembling the fixing member 60' to the valve body.

Figure 21:
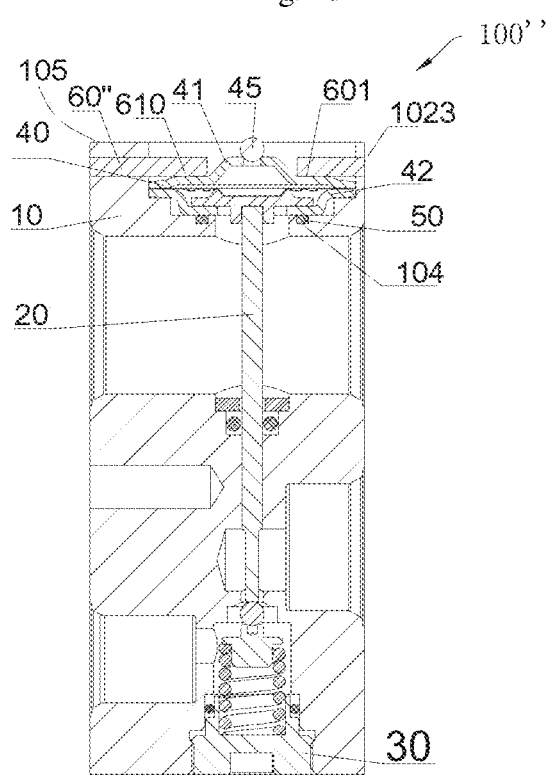
FIG. 21 is a schematic sectional view of yet another embodiment of the thermal expansion valve according to the present application.

In another embodiment, referring to FIG. 21, FIG. 21 is a schematic sectional view of a thermal expansion valve 100". Two or more fixing members 60" are provided and the fixing members 60" are pins or pressure plates. The first side wall 102 is provided with two or more fixing holes 1023, the fixing members 60" correspond to positions of the fixing holes 1023, and at least part of the fixing members 60" are located in the fixing holes 1023. At least part of the bottom wall 601 of the fixing members 60" is arranged in direct or indirect contact with at least part of the body portion 411. The height of the fixing members 60" is higher than the height of the body portion 411 in the height direction of the valve body 10. The valve body can be fixed to the pin or the pressure plate by welding. The two or more fixing holes 1023 are arranged at intervals to apply a certain pressure to the power head, such that it is easier for the power head to maintain the performance.

The thermal expansion valve 10 includes the sealing member 50. The valve body 10 includes the bottom wall 103 of the accommodating cavity. The power head 40 is in seal with the valve body 10, such that a space of the thermal expansion valve on one side of the power head facing the interior of the valve body is relatively isolated from a space of the thermal expansion valve on one side of the power head facing the exterior of the valve body. Specifically, at least part of the bottom portion 421 of the power head seat 42 abuts against the bottom wall 103 of the accommodating cavity, or part of the bottom portion of the power head seat 42 abuts against the bottom wall of the accommodating cavity through the sealing member 50. The sealing member 50 surrounds the circumferential bottom wall of the transmission member 44. At least part of the bottom portion 421 of the power head seat 42 abuts against the bottom wall 103 of the accommodating cavity, or part of the bottom portion of the power head seat 42 abuts against the bottom wall 103 of the accommodating cavity through the sealing member, or at least part of the bottom portion 421 of the power head seat 42 is separated from the bottom wall 103 of the accommodating cavity through the sealing member 50, which facilitates the sealing of the power head and the valve body.

In a specific embodiment, the bottom wall 103 of the accommodating cavity of the valve body 10 is provided with a slot 104. The slot 104 falls into a projection area of the bottom portion 421 of the power head seat towards the bottom wall 103 of the accommodating cavity, and the sealing member 50 is located in the slot 104. The sealing member may be a rectangular sealing ring to prevent leakage between the bottom portion 421 and the bottom wall 103 of the accommodating cavity. The position of the slot 104 falls into the projection area of the bottom portion 421 of the power head seat towards the bottom wall 103 of the accommodating cavity, such that the entire sealing ring 50 can be subjected to a downward compression force of the fixing member 60 to the power head, which is beneficial to the effectiveness of the sealing between the power head 40 and the valve body 10.

Figure 22:
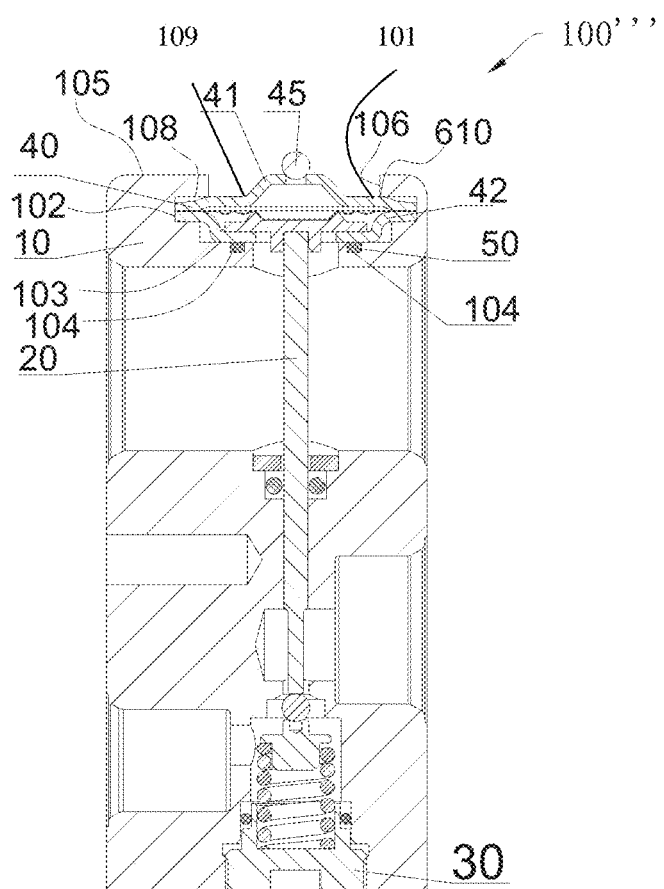
FIG. 22 is a schematic sectional view of still another embodiment of the thermal expansion valve according to the present application.

In another embodiment, reference to FIG. 22, the valve body 10 of the expansion valve 100''' includes the accommodating cavity 101, and at least part of the power head 40 is located in the accommodating cavity 101. The valve body 10 includes the top portion 105, the top portion 105 is provided with the opening 109, and at least part of the power head 40 extends into the opening 109. With the axial direction of the valve body 10 as the projection direction, the projection of the power head 40 towards the top portion 105 entirely falls on the top portion 105, such that the outer edge of the power head does not exceed the edge of the valve body. Since the size of the power head is relatively reduced, the weight of the thermal expansion valve is reduced.

The power head 40 includes the outer wall portion 610, the outer wall portion 610 is relatively facing the opening of the top portion 105, and the outer wall portion 610 is in contact with at least part of the valve body 10. The outer wall portion 610 is arranged on the power head cover, and the outer wall portion may be located at the protruding portion 411 of the power head cover 41, or may be located at the body portion 412 of the power head cover 41, or may be located at an edge portion of the power head cover.

The valve body 10 includes a top wall 108, and the top wall 108 is in contact with or close to at least part of the power head cover 41. The valve body 10 includes a second side wall 106 which is a ring wall. At least part of the top wall 108 is in contact with or close to at least part of the outer wall portion 610, which not only fixes the structures of the power head and the valve body, but also effectively prevents the deformation of the power head cover caused by force with the help of the outer wall portion 610, and is more beneficial to the stability of the performance of the valve.

Figure 23:
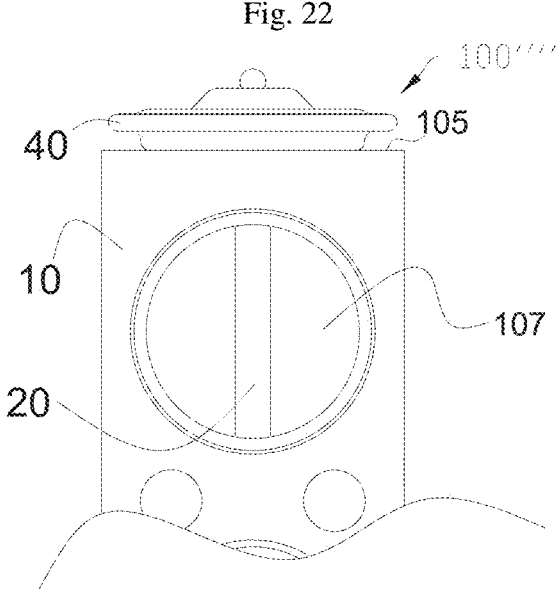
FIG. 23 is a schematic partial view showing the structure of yet still another embodiment of the thermal expansion valve according to the present application.
Figure 24:
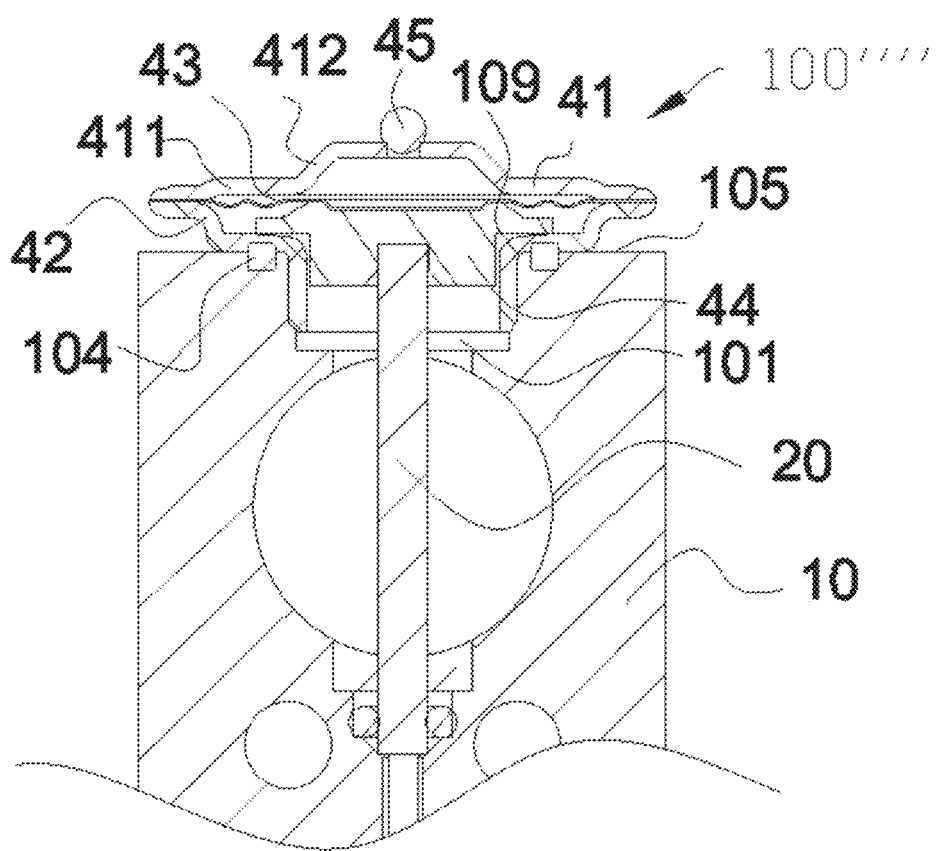
FIG. 24 is a schematic partial sectional view of the thermal expansion valve shown in FIG. 23.

In other embodiments, referring to FIGS. 23 and 24, the valve body 10 of an expansion valve 100''' includes the accommodating cavity 101, and at least part of the power head 40 is located in the accommodating cavity 101. The valve body 10 includes the top portion 105, the top portion 105 is provided with the opening 109, and at least part of the power head 40 extends into the opening 109. With the axial direction of the valve body 10 as the projection direction, the projection of the power head 40 towards the top portion 105 falls on the top portion 105, such that the outer edge of the power head does not exceed the edge of the valve body. Since the size of the power head is relatively reduced, the weight of the thermal expansion valve is reduced. The bottom wall of the accommodating cavity of the valve body 10 is step-shaped, the bottom wall of the accommodating cavity includes a low bottom wall and a high bottom wall, and the high bottom wall is higher than the low bottom wall in the height direction of the valve body. At least part of the bottom portion of the power head seat is in sealing engagement with part of the bottom wall of the accommodating cavity by the sealing member, that is, at least part of the bottom portion of the power head seat is in sealing engagement with the high bottom wall by the sealing member. For example, the sealing member is a sealing ring. As shown in FIG. 24, the high bottom wall is arranged on an upper end face of the valve body 10, and the low bottom wall is located at the bottom of the accommodating cavity 101. The high bottom wall here may be the upper end face of the valve body 10 or a bottom wall of a countersink provided on the upper end face of the valve body 10. In the latter case, the accommodating cavity is equivalent to a multi-step hole.

Herein, the height direction of the valve body refers to a direction from the regulating base 30 to the power head 40, and a height of a component along the height direction of the valve body refers to the lowest height value of the component.

Herein, the contact arrangement includes a direct contact arrangement between the components, and the indirect contact arrangement between the bottom wall of the fixing member and the outer wall portion includes the indirect contact arrangement between the bottom wall of the fixing member and the outer wall portion realized by providing a gasket or other components.

Herein, the axial direction of the valve body 10 is taken as a vertical direction, the position of the power head 40 is taken as the up direction, and the position of the regulating base is taken as the down direction. The highest is taken as the top, and the lowest is taken as the bottom.

Herein, the center of the membrane 43 is taken as the inside, and the edge of the membrane 43 is taken as the outside.

It is should be noted that the above embodiments are only for illustrating rather than limiting the technical solutions described in the present application, such as the definition of directions of "front", "rear", "left", "right", "up", and "down". Although the present application has been described in detail with reference to the above embodiments, it should be understood by those skilled in the art that the present application still can be combined, modified or equivalently substituted by those skilled in the art, and all the technical solutions and improvements without departing from the spirit and scope of the present application fall within the scope of the appended claims of the present application.

The invention claimed is:

1. A thermal expansion valve, comprising a power head and a valve body, wherein
the power head is fixed to the valve body;
the power head comprises a power head seat, a power head cover and a membrane, and the power head cover is fixed to the power head seat;
the membrane comprises a first flat portion, the first flat portion is located close to an edge of the membrane, the first flat portion is fixed to the power head cover and the power head seat, the membrane comprises a membrane recess and a corrugated portion, and the membrane recess is located at a center position of the membrane;
the corrugated portion is located between the first flat portion and the membrane recess, and the membrane recess is recessed in a direction away from the power head cover;
the valve body comprises a top portion, the top portion is provided with an opening, at least part of the power head extends into the opening, and with an axial direction of the valve body as a projection direction, a projection of the power head towards the top portion falls entirely on the top portion,
the thermal expansion valve comprises a valve stem and a transmission member,
the membrane recess comprises a protruding top wall, the protruding top wall is located at a side facing the transmission member, the transmission member has a transmission member recess, the transmission member recess is recessed in a same direction as the membrane recess, the transmission member recess is matched with a shape of the protruding top wall, and the protruding top wall is in contact with a bottom wall of the transmission member recess.

2. The thermal expansion valve according to claim 1, wherein the membrane is located between the power head cover and the power head seat, the transmission member comprises a position-limiting groove, the position-limiting groove is in cooperation with one end of the valve stem, and the position-limiting groove does not exceed an edge of the power head in an axial direction of the power head.

3. The thermal expansion valve according to claim 2, wherein
the power head cover comprises a first inner wall portion and a second inner wall portion, the second inner wall portion is arranged around the first inner wall portion, the first inner wall portion protrudes upward relative to the second inner wall portion, a position of the first inner wall portion is opposite to a position of the membrane recess, and the corrugated portion is opposite to at least part of the second inner wall portion; and
the transmission member is located below the membrane, and the protruding top wall is in contact with or close to the transmission member.

4. The thermal expansion valve according to claim 3, wherein the transmission member recess is located at a center position of the transmission member, the power head comprises a bottom opening, and an equivalent diameter of a periphery of the transmission member is greater than that of the bottom opening.

5. The thermal expansion valve according to claim 3, wherein the membrane comprises a second flat portion, the second flat portion is located between the corrugated portion and the membrane recess;
the membrane recess has a bottom wall and a side wall, the side wall of the membrane recess surrounds the bottom wall of the membrane recess, the side wall of the membrane recess comprises an inner circumferential portion and an outer circumferential portion, the inner circumferential portion is adjacent to the bottom wall of the membrane recess, and the outer circumferential portion is adjacent to the second flat portion, a distance between the inner circumferential portion and a center of the membrane is smaller than a distance between the outer circumferential portion and the center of the membrane.

6. The thermal expansion valve according to claim 3, wherein the protruding top wall is close to the transmission member, the membrane comprises a second flat portion, the second flat portion is located between the corrugated portion and the membrane recess, one side portion of the second flat portion is in contact with the transmission member, the transmission member comprises a support surface, the support surface faces toward the membrane, and the support surface is in contact with a bottom surface of the second flat portion.

7. The thermal expansion valve according to claim 6, wherein the corrugated portion has an annular portion protruding toward the power head cover, the number of the annular portion is 1 to 3; and in a case that more than one annular portions are provided, radiuses of annular portions are different from each other in a radial direction of the membrane;

the membrane comprises a trough portion, the trough portion is located between the second flat portion and the annular portion, or the annular portion is adjacent to the second flat portion, or in a case that two or more annular portions are provided, the membrane comprises a trough portion, and the trough portion is located between adjacent annular portions; and
one side surface of the first flat portion is fixed to the power head cover by welding, another side surface of the first flat portion is fixed to the power head seat by welding, the annular portion is adjacent to the first flat portion, or in a case that the membrane comprises the trough portion, the trough portion is located between the annular portion and the first flat portion.

8. The thermal expansion valve according to claim 1, wherein the valve body comprises an accommodating cavity in which at least part of the power head is located, an outer diameter of the power head is smaller than or equal to an equivalent diameter of the opening at the top portion, a space of the thermal expansion valve on one side of the power head facing interior of the valve body is relatively sealingly isolated from a space of the thermal expansion valve on one side of the power head facing exterior of the valve body;
the power head comprises an outer wall portion, the outer wall portion relatively faces the opening at the top portion, the thermal expansion valve comprises a fixing member, at least part of the fixing member is located in the accommodating cavity, along the axial direction of the valve body, with a position where the accommodating cavity is arranged in the valve body as an upper position, at least part of the fixing member is arranged above the outer wall portion, the fixing member comprises a bottom wall which faces the power head, and at least part of the bottom wall of the fixing member is in contact with the outer wall portion, or at least part of the bottom wall is close to the outer wall portion and at least part of the bottom wall is in indirect contact with the outer wall portion, the fixing member is assembled and fixed to the valve body, and the power head is fixed to the valve body via the fixing member; or
the power head comprises an outer wall portion, the outer wall portion relatively faces the opening at the top portion, and the outer wall portion is in contact with or close to at least part of the valve body.

9. The thermal expansion valve according to claim 8, wherein the valve body comprises a first side wall; two or more fixing members are provided, the fixing members are pins or pressure plates, the first side wall is provided with two or more fixing holes, the pins or pressure plates correspond to positions of the fixing holes, and at least part of the pins or pressure plates are located in the fixing holes, the power head cover comprises a body portion and a protruding portion, and the protruding portion is located in a center position of the power head cover, the bottom wall of the pins or pressure plates is in direct or indirect contact with at least part of the body portion, and a height of the pins or pressure plates is higher than a height of the body portion along a height direction of the valve body.

10. The thermal expansion valve according to claim 8, wherein the valve body comprises a top wall, at least part of the top wall is in contact with or close to the outer wall portion.

11. The thermal expansion valve according to claim 8, wherein the thermal expansion valve comprises a sealing member, the power head seat comprises a bottom portion, and the bottom portion of the power head seat is arranged opposite to a wall portion of the valve body, and the valve body comprises a bottom wall of the accommodating cavity; and the bottom wall of the accommodating cavity is provided with a slot, the slot falls into a projection area of the bottom portion of the power head seat towards the bottom wall of the accommodating cavity, and the sealing member is located in the slot; or at least part of the bottom portion of the power head seat is in sealing engagement with part of the bottom wall of the accommodating cavity by the sealing member.

12. The thermal expansion valve according to claim 8, wherein the valve body has an integrated structure, the power head cover comprises a body portion and a protruding portion, the protruding portion is located at a center position of the power head cover, the fixing member comprises a center through hole, the protruding portion is arranged in the center through hole, the valve body comprises a first side wall, the fixing member comprises a connecting portion, the connecting portion is formed at a circumferential side wall portion of the fixing member, and the connecting portion is fixedly arranged relative to the first side wall.

13. The thermal expansion valve according to claim 12, wherein the fixing member is provided with an external thread, the fixing member is in a threaded connection with the valve body, the connecting portion is integrally formed on the circumferential side wall portion of the fixing member in an external thread form, at least part of the first side wall is provided with an internal thread which extends inward from a port of the accommodating cavity or from a position adjacent to the port, and the external thread is in threaded engagement with the internal thread.

14. The thermal expansion valve according to claim 12, wherein the fixing member is a clamp spring, the clamp spring comprises a central through hole, the protruding portion is located in the central through hole, at least part of the first side wall is provided with a groove; along a height direction of the valve body, a height of the groove is higher than a height of the body portion, the groove comprises a groove bottom wall, the groove bottom wall is opposite to a groove opening, the connecting portion is at least part of the circumferential side wall portion of the clamp spring, the connecting portion is located in the groove, and an outer side portion of the connecting portion directly or indirectly abuts against the groove bottom wall to keep stationary relative to the groove.

15. The thermal expansion valve according to claim 12, wherein the fixing member comprises at least two positioning holes, openings of the at least two positioning holes are located on a same side of the fixing member and are located on one side portion of the fixing member relatively away from the power head, the at least two positioning holes are arranged in symmetry about a central axis of the fixing member, and a diameter of the central through hole of the fixing member is greater than a circumferential diameter of the protruding portion.

* * * * *